(12) United States Patent
Shitagami et al.

(10) Patent No.: US 8,331,016 B2
(45) Date of Patent: Dec. 11, 2012

(54) ELECTROPHORETIC DISPLAY DEVICE

(75) Inventors: Kozo Shitagami, Chino (JP); Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 16 days.

(21) Appl. No.: 13/117,660

(22) Filed: May 27, 2011

(65) Prior Publication Data

US 2011/0304904 A1  Dec. 15, 2011

(30) Foreign Application Priority Data

Jun. 15, 2010  (JP) ................................. 2010-136134

(51) Int. Cl.
G02B 26/00 (2006.01)

(52) U.S. Cl. ...................................... 359/296

(58) Field of Classification Search .................... 359/296
See application file for complete search history.

(56) References Cited

U.S. PATENT DOCUMENTS

| | | | |
|---|---|---|---|
| 6,750,844 B2 | 6/2004 | Nakanishi | |
| 7,385,751 B2 | 6/2008 | Chen et al. | |
| 7,572,491 B2 | 8/2009 | Wang et al. | |
| 7,729,040 B2 | 6/2010 | Uchida | |
| 2003/0048521 A1* | 3/2003 | Ikeda et al. | 359/296 |
| 2003/0227436 A1 | 12/2003 | Ikeda | |
| 2004/0135764 A1* | 7/2004 | Takeda | 345/107 |
| 2009/0284820 A1* | 11/2009 | Ejima et al. | 359/237 |
| 2010/0223779 A1* | 9/2010 | Lo et al. | 29/592.1 |

FOREIGN PATENT DOCUMENTS

| | | |
|---|---|---|
| JP | A-2002-139749 | 5/2002 |
| JP | A-2004-012944 | 1/2004 |
| JP | A-2005-010796 | 1/2005 |
| JP | A-2006-517038 | 7/2006 |
| JP | A-2008-107484 | 5/2008 |
| JP | A-2009-222902 | 10/2009 |
| WO | WO 2004/068233 A1 | 8/2004 |

* cited by examiner

Primary Examiner — James Jones
(74) Attorney, Agent, or Firm — Oliff & Berridge, PLC

(57) ABSTRACT

An electrophoretic display includes a substrate, first electrodes arranged on the substrate, an electrophoretic layer arranged on the substrate so as to cover the first electrodes, a partition wall that divides the electrophoretic layer into a plurality of cells, and a second electrode arranged on the electrophoretic layer. The electrophoretic layer has electrophoretic particles and a dispersion medium that disperses the electrophoretic particles. The second electrode protrudes towards the first electrodes at the cell.

8 Claims, 9 Drawing Sheets

ELECTROPHORETIC DISPLAY DEVICE

BACKGROUND

1. Technical Field

The present invention relates to an electrophoretic display device.

2. Related Art

It is generally known that particles move or migrate in a dispersion liquid by a Coulomb force when an electric field is applied to the liquid in which the particles are dispersed. This phenomenon is called electrophoresis. Electrophoretic display devices are receiving much attention as new display devices which can display desirable information and images by using electrophoresis. The electrophoretic display devices include such features as a display memory and a wide viewing angle with no voltage application, and also high-contrast display with low power consumption.

Moreover, since the electrophoretic display devices are of the non-light-emitting type, they are gentler on the eyes than light-emitting display devices such as cathode-ray tube displays. As such electrophoretic display devices, JP-A-2008-107484, for example, discloses a known device in which a plurality of spaces (also mentioned as cells hereinafter) are formed with a partition wall between a pair of substrates, with the dispersion liquid described above sealed in each cell. This is called a partition wall structure.

Crosstalk can be easily generated between adjacent cells in the electrophoretic display device of a partition wall structure having multiple cells formed with a partition wall. In other words, among adjacent cells, a drive voltage at one cell (in other words, voltage between electrodes on the top and bottom of the cell in a sectional view) is likely to affect another cell electrically. When crosstalk is large, an image display is likely to have less contrast.

The present invention is thus made with consideration of these unsolved problems, and the object is to provide an electrophoretic display device capable of crosstalk reduction.

SUMMARY

An advantage of some aspects of the invention is that an electrophoretic display device includes a substrate, first electrodes arranged on the substrate, an electrophoretic layer arranged on the substrate so as to cover the first electrodes, a partition wall for dividing the electrophoretic layer into a plurality of storage sections, and a second electrode arranged on the electrophoretic layer; wherein the electrophoretic layer has electrophoretic particles and a dispersion medium for dispersing the electrophoretic particles; and wherein the second electrode protrudes towards the first electrode at each one of the plurality of storage sections.

Accordingly, at each one of the multiple storage sections (also mentioned as cells hereinafter) divided by the partition wall, a distance d1 between the first and the second electrode at the center of a cell in plan view is preferably shorter than a distance d2 between the electrodes at the periphery of the cell in plan view. (See FIG. 2 as an example.) Thus, the electric field intensity between the electrodes at the center of a cell in plan view can be higher than that at the periphery of the cell in plan view, thereby limiting the electric field at the periphery of the cell from electrically affecting electrophoretic particles in other cells adjacent to the cell. As a result, crosstalk between the adjacent cells is reduced, so that an image is expected to have more contrast. Shortening the distance d1 between the electrodes also allows the reduction of a drive voltage at each cell. Accordingly, the electrophoretic display device is expected to use less power. The substrate corresponds to a circuit substrate 1 below; the first electrodes correspond to pixel electrodes 2 below; and the second electrode corresponds to a counter electrode 6 below.

The dispersion medium may be a lipophilic solvent, and the surface of the partition wall may be made of a lipophilic material in the electrophoretic display device, thus improving adherence between the partition wall and the dispersion medium at the periphery of a cell in plan view. The liquid surface of the dispersion medium at the periphery of the cell in plan view cannot easily go to a lower level than that at the center of the cell in plan view, so that the second electrode can easily protrude in the sectional view.

The contact angle θ between the dispersion medium and the partition wall is preferably within the range of 0°<θ20° in the electrophoretic display device, thereby increasing adherence between the partition wall and the dispersion medium at the periphery of a cell in plan view and also preventing the liquid surface of the dispersion medium from lowering. Thus, the second electrode can easily protrude in the sectional view.

It is also preferable that, in the electrophoretic display device, a surface opposing the second electrode of the electrophoretic layer be depressed relative to the protrusion of the second electrode at each one of the plurality of storage sections, and that the second electrode have a first conductive film filling the depressed section and a second conductive film covering the first conductive film. Thus, the depressed sections of the electrophoretic layer can be filled with the first conductive film to form a flat surface, and the second conductive film can be formed flat thereon. The surface of the second electrode can be made flat without losing such effects as the reduction of crosstalk and drive voltage.

The electrophoretic display device may also include a sealing film between the electrophoretic layer and the second electrode at each one of the plurality of storage sections, so that the electrophoretic layer can be sealed in the cells. Since direct contact between the electrophoretic layer and the second electrode is prevented, the second electrode is protected against, for instance, corrosion caused by contact with the dispersion medium of the electrophoretic layer.

It is also preferable that the sealing film be formed at a constant thickness along the surface of the electrophoretic layer in the electrophoretic display device. Therefore, for example, the depressed shape of the electrophoretic layer appears on the surface of the sealing film, and the second electrode can be formed thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the invention will be described with reference to the accompanying drawings, wherein like numbers reference like elements. Duplicate explanations will be omitted herein.

Embodiment 1

Electrophoretic Display Device

Figure 1:
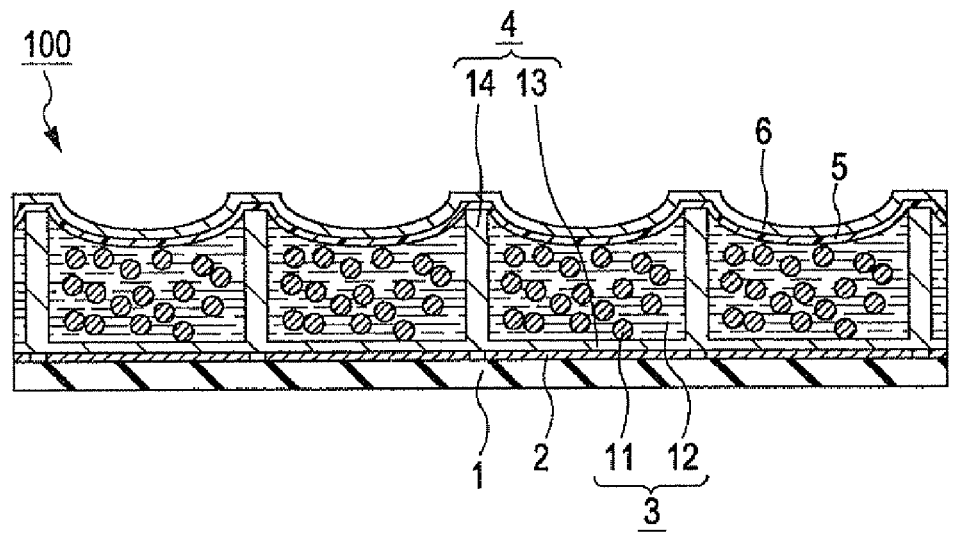
FIG. 1 is a diagram of an electrophoretic display device in accordance with an embodiment of the present invention.
Figure 2:
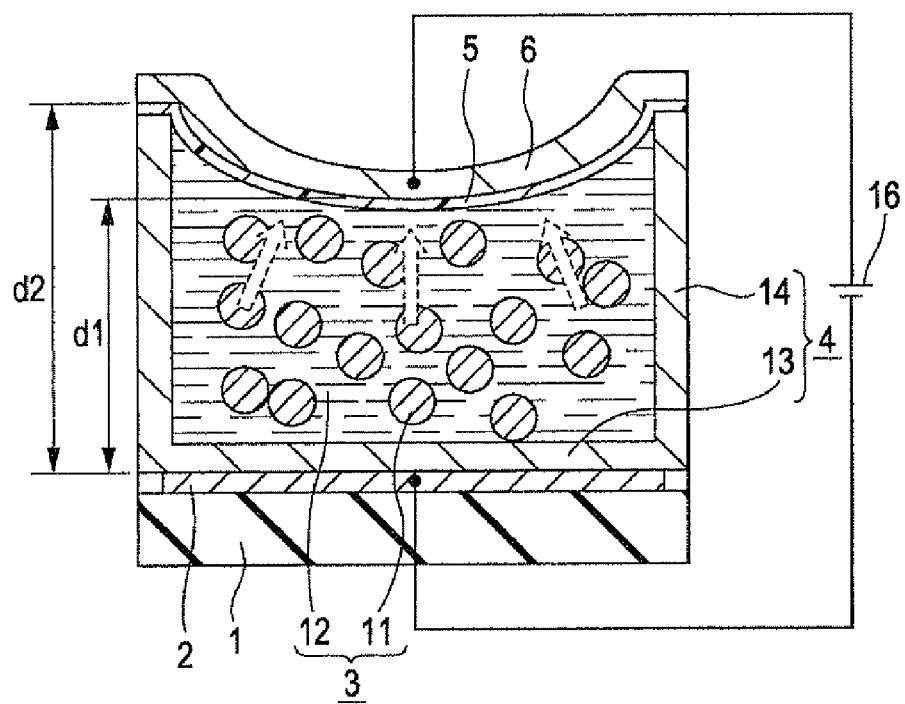
FIG. 2 is an enlarged sectional view of FIG. 1.

FIG. 1 is a sectional view showing an electrophoretic display device 100 relating to Embodiment 1 of the invention. FIG. 2 is an enlarged sectional view of FIG. 1, and is a sectional view of one cell.

As shown in FIG. 1 and FIG. 2, the electrophoretic display device 100 includes a circuit substrate 1, pixel electrodes 2 formed on the surface of the circuit substrate 1, an electrophoretic layer 3 arranged on the circuit substrate 1 so as to cover the pixel electrodes 2, a cell matrix 4 having a plurality of cells on the circuit substrate 1 and dividing the electrophoretic layer 3 into a plurality of storage sections by arranging the electrophoretic layer 3 in each cell, a sealing film 5 arranged on the electrophoretic layer 3, and a counter substrate (not shown) having a counter electrode 6 arranged on the sealing film 5.

The circuit substrate 1 has a plurality of pixel transistors (for instance, Thin Film Transistors (TFTs)) not shown in the figures on one surface thereof. Each pixel transistor is connected to the pixel electrodes 2 respectively through wiring. With this circuit substrate 1, a voltage can be selectively applied to the pixel electrodes 2 by turning on and off the pixel transistors. The circuit substrate 1 is a resin substrate made of an insulating resin such as polycarbonate (PC) and polyethylene terephthalate (PET), a glass substrate, or the like. To add flexibility to the electrophoretic display device, a flexible resin substrate is selected as the circuit substrate 1. The pixel electrodes 2 will be described below.

The electrophoretic layer 3 is a dispersion liquid having a plurality of electrophoretic particles 11 and a dispersion medium 12 in which the electrophoretic particles 11 are dispersed. The electrophoretic particles 11 are, for instance, pigment particles, resin particles or composite particles thereof. Pigments of the pigment particles include, for example, black pigments such as aniline black and carbon black, and white pigments such as titanium oxide and antimony oxide. Resins of the resin particles include, for instance, acrylic resin, urethane resin, urea resin, epoxy resin, polystyrene and polyester. Examples of the composite particles include: pigment particles having their surfaces coated with a resin or another pigment; particles in which the surface of resin particles is coated with a pigment; and particles made of a mixture in which a pigment and a resin are mixed at an appropriate ratio. The electrophoretic particles 11 made of these various materials are dispersed in the dispersion medium 12 while they are charged positive or negative.

The dispersion medium 12 is, for instance, a lipophilic hydrocarbon solvent such as Isopar®. In other words, the dispersion medium 12 is a liquid containing at least one of, for example, Isopar E, Isopar G, Isopar H, Isopar L and Isopar M, a liquid containing two or more of the aforementioned, or a liquid in which at least one of the aforementioned and another hydrocarbon solvent are mixed.

Further, the dispersion medium 12 may be, for example, aliphatic hydrocarbons such as pentane, hexane and octane; alicyclic hydrocarbons such as cyclohexane and methyl cyclohexane; aromatic hydrocarbons such as benzenes having a long-chain alkyl group (alkylbenzene derivatives) such as benzene, toluene, xylene, hexyl benzene, heptyl benzene, octyl benzene, nonyl benzene, decyl benzene, undecyl benzene, dodecyl benzene, tridecyl benzene and tetradecyl benzene; aromatic heterocycles such as pyridine, pyrazine, furane, pyrrole, thiophene and methyl pyrolidone; esters such as methyl acetate, ethyl acetate, butyl acetate and ethyl formate; ketones such as acetone, methyl ethyl ketone, diethyl ketone, methyl isobutyl ketone, methyl isopropyl ketone and cyclohexanone; nitryles such as acetonitrile, propionitrile and acrylonitrile; amides such as N,N-dimethylformamide and N,N-dimethylacetamide; carboxylate salt; and other various oils. These may be used alone or as a mixture thereof.

The cell matrix 4 has, for instance, a base 13 and a partition wall 14 arranged on the base 13. The base 13 forms the bottom of the cell matrix 4, and is made of a sheet or flat member. There is no limitation on the thickness of the base 13, and the base may be a thin film of about several to dozens μm in thickness. Furthermore, the partition wall 14 forms the side wall of the cell matrix 4, dividing the electrophoretic layer 3 into a plurality of storage sections. A plurality of spaces, in other words cells, are formed on the circuit substrate 1 with the partition wall 14, and the electrophoretic layer 3 is provided in each of the plurality of cells.

The plan view (also mentioned as plan shape hereinafter) of the partition wall 14 is, for instance, a square grid, a hexagonal grid or a triangular grid.

Figure 3A:
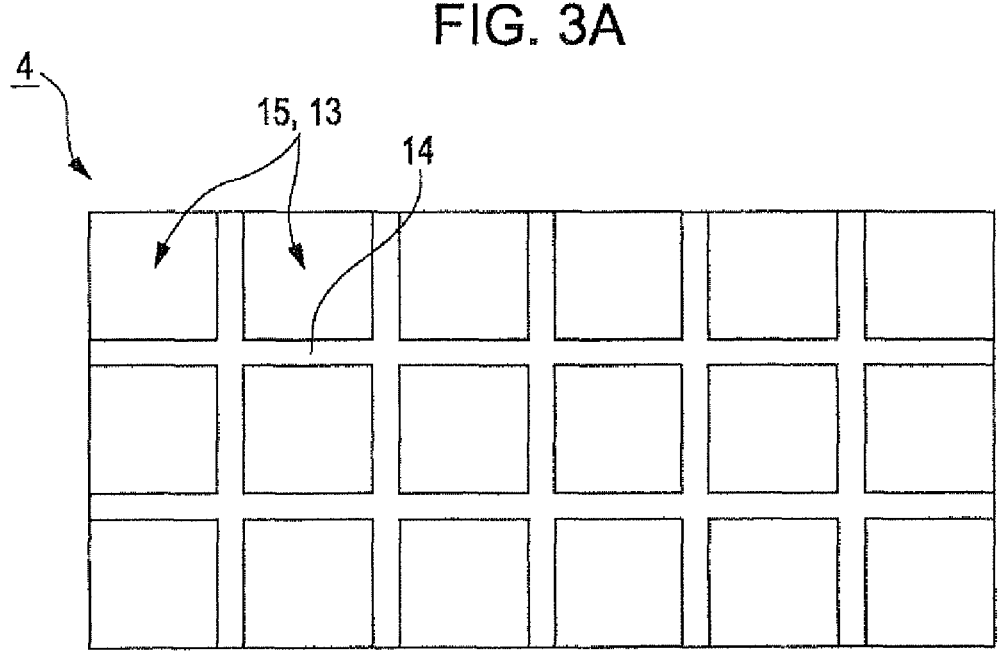
FIGS. 3A and 3B are plan views illustrating a cell matrix of the device.
Figure 3B:
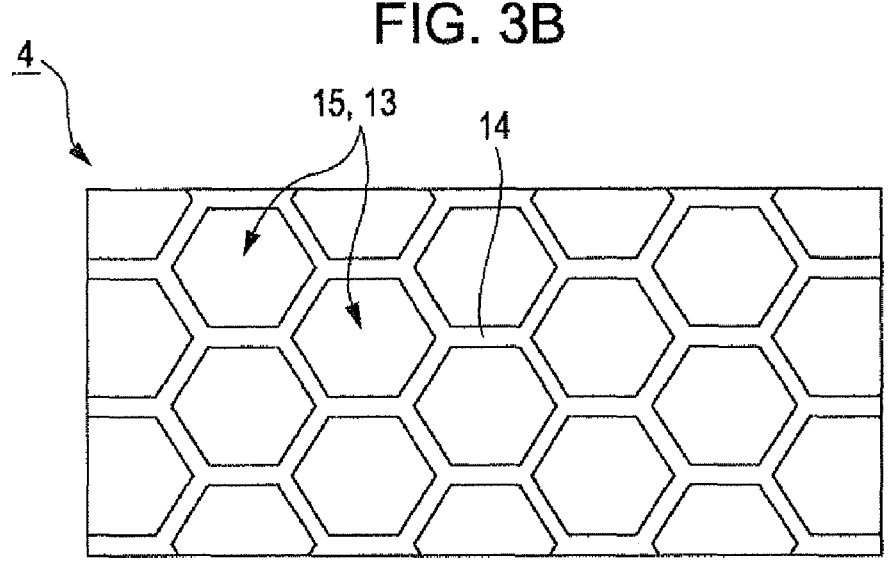

FIGS. 3A and 3B are plan views showing a cell matrix 4. When the plan shape of the partition wall 14 is a square grid as shown in FIG. 3A, the plan shape of a cell 15 is square. Also, when the plan shape of the partition wall 14 is a hexagonal grid as shown in FIG. 3B, the plan shape of the cell 15 is hexagonal.

FIG. 1 and FIG. 2 show the partition wall 14 formed as one body with the flat base 13, but this is only an example. In this embodiment, the wall partition 14 and the flat base 13 may be formed individually, and the wall partition 14 may be fixed to one side of the flat base 13. Alternatively, the cell matrix 4 may be formed only of the partition wall 14 without the base 13. In this case, the partition wall 14 may be directly mounted on the circuit substrate 1.

When the base 13 and the partition wall 14 are formed in one body, they are made of the same material. Moreover, when the base 13 and the partition wall 14 are formed separately, they may be made of the same material or different materials.

The base 13 may be made of flexible or hard materials: for instance, resins such as epoxy resin, acrylic resin, urethane resin, melamine resin and phenolic resin; and ceramics such as silica, alumina and titanic. However, in the case where plasticity is to be added to the electrophoretic display device 100, a resin having plasticity is selected for the base 13. In addition, materials of the partition wall 14 include, for instance, resins such as epoxy resin, acrylic resin, urethane resin, melamine resin and phenolic resin, and ceramics such as silica, alumina and titania.

It is preferable to choose a material having a high affinity with the electrophoretic layer 3, as the partition wall 14. For example, when the electrophoretic layer 3 is lipophilic, the partition wall 14 is preferably made of a lipophilic material. In this case, the entire partition wall 14 may be made of a lipophilic material, or only the surface of the partition wall 14 may be made lipophilic. Examples of treating the surface of the partition wall 14 to be liphophilic include: a surface treatment (for remaking the surface of the partition wall 14 liphophilic by a chemical reaction); and film deposition (in other words, a treatment for forming a liphophilic film on the surface of the partition wall 14 by coating, physical vapor deposition or chemical vapor deposition, or a treatment for applying a liphophilic film).

Furthermore, it is preferable that the contact angle θ between the dispersion medium 12 and the partition wall 14 be within the range of 0°<θ<20° in the invention. Thus, adhesion between the dispersion medium 12 and the partition wall 14 improves, and the cross-sectional profile of the electrophoretic layer 3 surface is easily depressed.

The sealing film 5 is for sealing the electrophoretic layer 3 in the cells. The sealing film 5 is formed along the surface of the electrophoretic layer 3 at a constant thickness, so that the depression on the surface of the electrophoretic layer 3 appears on the surface of the sealing film 5. The thickness of the sealing film 5 is, for example, about 5 to 10 μm. Materials of the sealing film 5 include, for instance, water soluble macromolecules. More specifically, the film contains one or more of polyvinyl alcohol (PVA), amino acid, gum arabic, alginate derivatives, albumin, carboxymethyl cellulose, cellulose derivatives, gelatin, polyethylene oxide, polystyrene sulfonate, polyvinyl pyrolidone, polyvinyl phenol, polyvinyl acetate derivatives, and lecithin.

When a hydrocarbon solvent, for instance Isopar, is selected as the dispersion medium 12 and a water soluble macromolecular film such as PVA is used as the sealing film 5, the following advantages are found.

In other words, a hydrocarbon solvent such as Isopar and PVA are both more affordable, thus cutting manufacturing costs. Moreover, the sealing film 5 is formed transparent, thus providing about 90% of light transmittance. Since light attenuation at the sealing film 5 is small, it becomes possible to increase the visibility of letters, images, etc. on the screen covered with the sealing film 5 (in other words, aggregation of a plurality of cells 15). Additionally, since compatibility between the sealing film 5 and the electrophoretic layer 3 is extremely small, the electrophoretic layer 3 can be sealed in the cells in an airtight condition.

The pixel electrodes 2 are formed on the side of the circuit substrate 1 opposing the electrophoretic layer 3. The counter electrode 6 is formed on the side of the counter substrate (not shown) opposing the electrophoretic layer 3. The pixel electrodes 2 are, for instance, electrodes formed per pixel, and the counter electrode 6 is, for example, an electrode formed over the plurality of pixels (in other words, common electrode). The pixel electrodes 2 and the counter electrode 6 are made of a poorly light-transmissive (or opaque) conductive film such as aluminum (Al), or a highly light-transmissive (or transparent) conductive film such as indium tin oxide (ITO).

When the circuit substrate 1 is transparent and the pixel electrodes 2 are made of ITO or the like, letters, images and the like on a screen can be visually recognized from the circuit substrate 1. When the counter substrate is transparent and the counter electrode 6 is made of ITO or the like, letters, images and the like on a screen can be visually recognized from the counter substrate.

Furthermore, the counter electrode 6 protrudes towards the pixel electrodes 2 at each one of the plurality of cells 15 in the electrophoretic display device 100. In other words, as shown in FIG. 1 and FIG. 2, the bottom surface of the counter electrode 6 protrudes at each one of the plurality of cells 15. A distance d1 between the pixel electrode 2 and the counter electrode 6 (in other words, between the electrodes) at the center of a cell in plan view (simply mentioned also as the center of a cell hereinafter) is shorter than a distance d2 between the electrodes at the periphery of the cell in plan view (simply described also as the periphery of the cell below). In other words, the distance between the electrodes is d1<d2.

In other words, at each one of the plurality of cells 15, the distance between the pixel electrode 2 and the counter electrode 6 becomes gradually smaller from the periphery (edge) of a cell towards the center of the cell. Moreover, the surface of the electrophoretic layer 3 is curved. The distance between the electrodes indicates the shortest distance between the pixel electrode 2 and the counter electrode 6.

For example, as shown in FIG. 2, when the pixel electrode 2 is also formed directly below the partition wall 14, the distance d1 between the electrodes at the center of a cell and the distance d2 between the electrodes at the periphery of the cell are the distances in an orthogonal (perpendicular) direction towards the surface of the pixel electrode 2.

Figure 11:
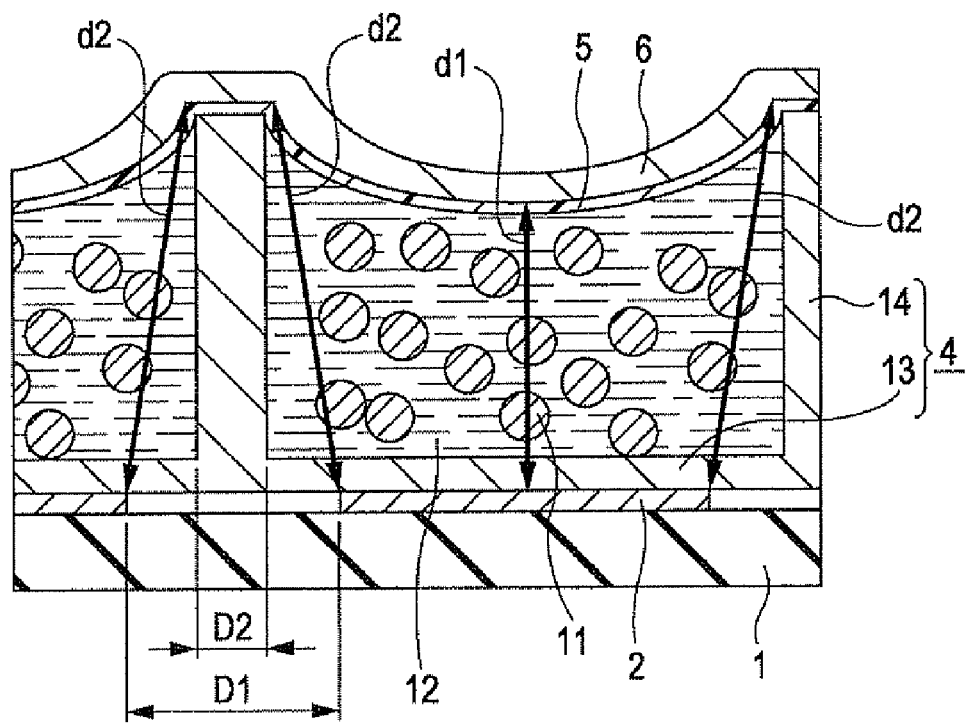
FIG. 11 is a diagram illustrating another example of a cell.

On the other hand, for example, as shown in FIG. 11, it may be unnecessary to form the pixel electrode 2 directly below the partition wall 14. (In other words, the distance D1 between the adjacent pixel electrodes 2 can be longer than the width D2 of the partition wall 14.) In this case, the distance d2, between the electrodes at the periphery of the cell is the distance from the edge of the pixel electrode 2 to the edge of the counter electrode 5. As a result, the distance d1 between the electrodes at the center of the cell is the distance in the perpendicular direction to the surface of the pixel electrode 2, and the distance d2 between the electrodes at the periphery of the cell 15 is the distance in the diagonal direction towards the surface of the pixel electrode 2.

As the distance between the electrodes is set at d1<d2, the electric field intensity between the electrodes at the center of a cell can be made higher than that at the periphery of the cell, thereby limiting the electric field at the periphery of the cell from electrically affecting electrophoretic particles 11 at other cells which are adjacent to the cell. As a result, crosstalk between the adjacent cells can be reduced.

Figure 4:
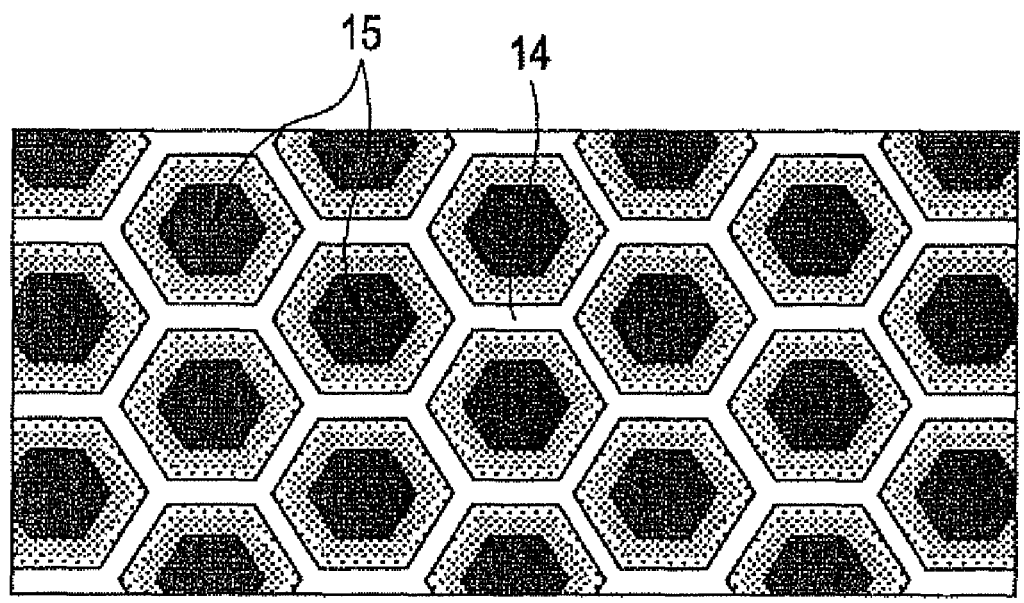
FIG. 4 is a schematic view showing an experiment with a black display.

FIG. 4 is a schematic view showing the result when an experiment is carried out to display a black color with the electrophoretic display device 100. In this experiment, negatively charged black particles are used as the electrophoretic particles 11. Moreover, as shown in FIG. 2, a power source 16 is connected between the electrodes, and the voltage (drive voltage) is set at 60 V.

As shown in FIG. 4, when voltage of 60 V is applied between the electrodes, it is found that black color intensifies at the center of a cell 15 more than at the periphery of the cell 15. This means that the driving force at the periphery of the cell 15 is lower than that at the center of the cell 15 and that crosstalk is restrained between the adjacent cells 15. As the distance between the electrodes is d1<d2, the electric field intensity between the electrodes at the center of the cell 15 is larger than that at the periphery of the cell 15. Thus, it is considered that, as indicated with broken-line arrows in FIG. 2, the electrophoretic particles 11 are more attracted to the counter electrode 6 at the center of a cell with more electric field intensity than at the periphery of the cell.

Method of Manufacturing the Electrophoretic Display Device

The method of manufacturing the electrophoretic display device 100 described above will be explained.

FIGS. 5A, 5B, 5C and 5D, and FIGS. 6A and 6B are cross-sectional views showing the methods of manufacturing the electrophoretic display device 100 relating to the first embodiment of the present invention.

Figure 5A:
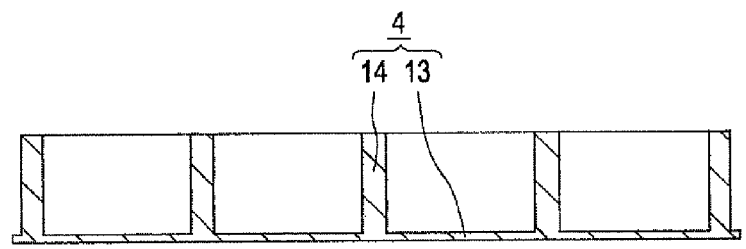
FIGS. 5A, 5B, 5C and 5D show a method for manufacturing the device relating to the embodiment.
Figure 5B:
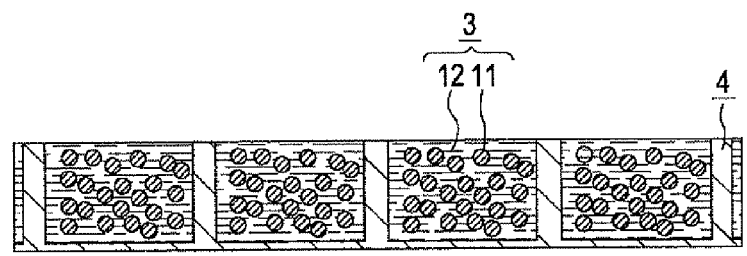

As shown in FIG. 5A, the cell matrix 4 is first prepared. Then, as shown in FIG. 5B, the electrophoretic layer 3 (in other words, dispersion liquid having a plurality of electrophoretic particles 11 and dispersion medium 12) is supplied to each cell of the cell matrix 4 through an opening in each cell. The electrophoretic layer 3 is supplied to each cell by, for instance, a dropping method using a dispenser, an ink jet method (liquid droplet jet method), a spin coating method, a dip coating method, a spray coating method, and the like. Among these methods, the dropping method or the ink jet method is preferable. The electrophoretic layer 3 can be selectively supplied to storage sections by the dropping method or the ink jet method, so that the layer can be supplied to the cells without waste.

Figure 5C:
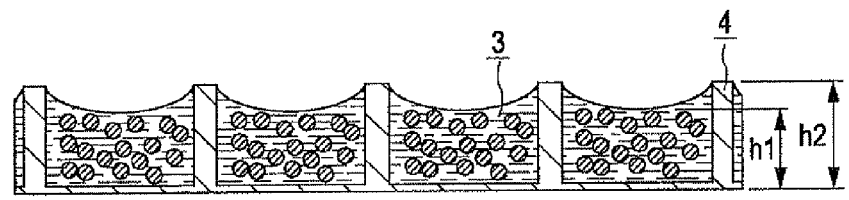

It is preferable to allow a certain waiting time after the electrophoretic layer 3 is supplied to cells. As a result, as shown in FIG. 5C, the surface of the electrophoretic layer 3 (in other words, liquid surface) gets lower at the center of a cell, and the cross-sectional profile thereof is depressed. This will be explained in further detail.

Figure 7:
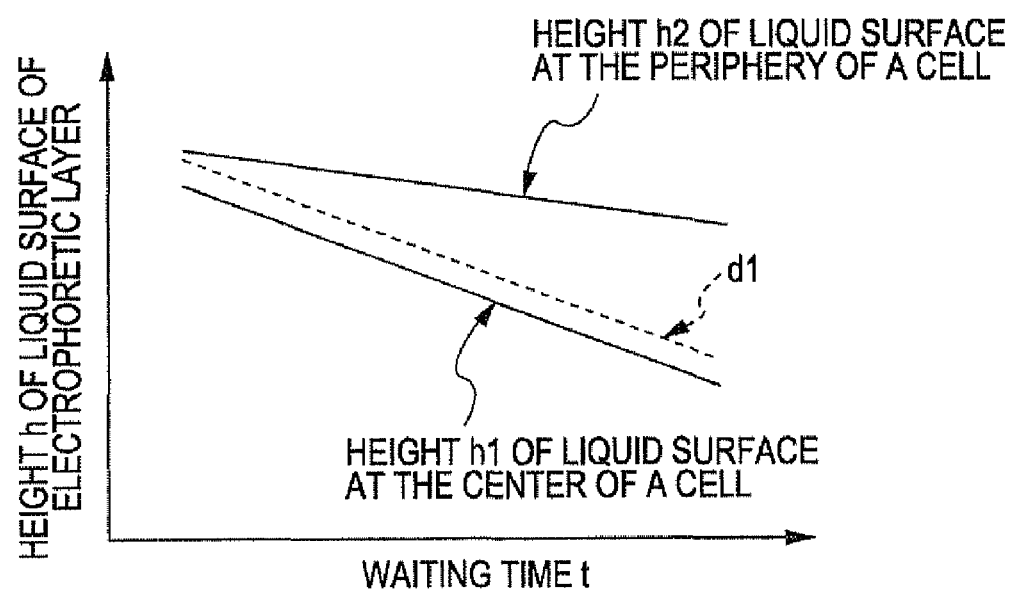
FIG. 7 is a graph showing a relationship between the height h of liquid surface of an electrophoretic layer and a waiting time t.

FIG. 7 is a graph showing a relationship between the height h of the liquid surface of the electrophoretic layer 3 and the waiting time t. As shown in FIG. 7, there is a correlation between the height h and the waiting time t: the height t is likely to decrease as the waiting time t increases. This tendency is more notable at the center of a cell than at the periphery of the cell. In other words, the height h1 of the liquid surface at the center of a cell is likely to become lower than the height h2 of the liquid surface at the periphery of the cell. This is because the electrophoretic layer 3 is in contact with the partition wall 14 at the periphery of the cell and its surface is thus supported, but the surface has no support at the center of the cell.

As shown in FIG. 7, the height h1 of the liquid surface of the electrophoretic layer 3 at the center of a cell is proportional to the distance d1 between the electrodes at the center of the cell. (The difference between h1 and d1 is the thickness of the sealing film 5.) Thus, based on this relation, a desirable distance d1 between the electrodes can be obtained by adjusting the waiting time t.

Moreover, as shown in FIG. 7, the height h2 of the liquid surface of the electrophoretic layer 3 at the periphery of a cell does not easily go to a lower level as the adhesion between the layer 3 and the partition wall 14 increases. Therefore, a decrease in height h2 of the liquid surface is prevented by selecting materials for the partition wall 14 and the electrophoretic layer 3 that have high mutual affinity.

For instance, when the electrophoretic layer 3 is lipophilic, a lipophilic material is selected for the partition wall 14, thus improving the adhesion between the electrophoretic layer 3 and the partition wall 14 and preventing the height h2 from decreasing. (In other words, the slope of h2 which is negative along the waiting time t can be more gradual in FIG. 7.) The electrophoretic layer 3 which is lipophilic can be provided by using, for instance, a lipophilic hydrocarbon solvent such as Isopar for the dispersion medium 12. Alternatively, the adhesion between the dispersion medium 12 and the partition wall 14 increases by selecting materials for the medium 12 and the wall 14 so as to provide the contact angle θ between the medium 12 and the wall 14 within the range of 0°<θ<20°. (In this case, a lipophilic solvent may also be selected for the dispersion medium 12, and a lipophilic material may be chosen for the partition wall 14.) More preferably, the contact angle θ between the dispersion medium 12 and the partition wall 14 should be within the range of 0°<θ<10°.

Therefore, it is possible to set the heights h1 and h2 of the liquid surface at the center and periphery of a cell at a desirable level by adjusting the waiting time t and selecting materials of the electrophoretic layer 3 and the partition wall 14 based on the correlation shown in FIG. 7, etc. (In other words, it is possible to obtain a desirable depressed shape, depth and so forth for the surface of the electrophoretic layer 3.)

Figure 5D:
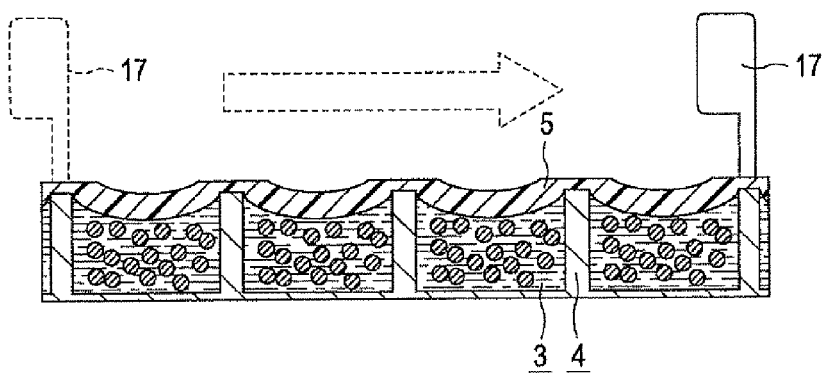

Subsequently, as shown in FIG. 5D, the openings of the cell matrix 4 are covered with the sealing film 5 after the electrophoretic layer 3 is supplied to the matrix, so that the layer 3 is sealed in each cell of the cell matrix 4. The method of forming the sealing film 5 is, for instance, as follows. Water soluble macromolecules are dissolved in water or a hydrophilic liquid such as methanol or ethanol, thus preparing a sealing solution. For example, when PVA is selected as water soluble macromolecules, PVA is dissolved in water to prepare the sealing solution of 3 to 40 wt. %. Then, the sealing solution is applied on the openings of the cell matrix 4 so as to form the sealing film 5. The electrophoretic layer 3 is lipophilic and the sealing film 5 is hydrophilic, so that the layer 3 and the sealing film 5 do not blend with each other. Therefore, by forming the sealing film 5 on the exposed portions of the electrophoretic layer 3 supplied to the cells, the layer 3 can be sealed in the cells in an airtight condition.

The sealing solution is evenly applied over the openings of the cell matrix 4 by using, for instance, a squeegee 17. Besides this, other applications using a die coater, a comma coater or the like may be used.

Figure 6A:
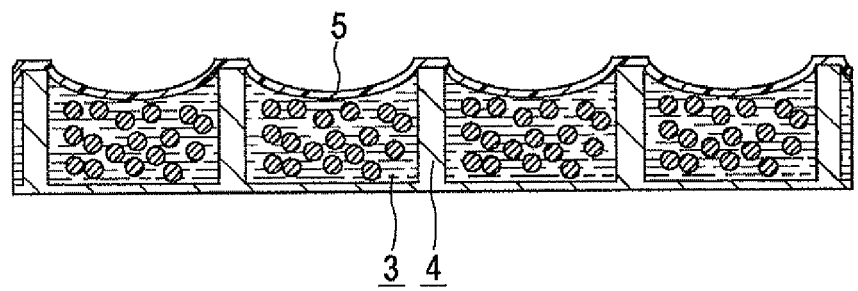
FIGS. 6A and 6B show a method for manufacturing the device relating to the embodiment.

The sealing film 5 is hardened by drying. For instance, the sealing film 5 is left in an environment of about room temperature to 50° C. for drying and hardening. The duration of the drying process depends on the thickness of the sealing film 5, but is about several minutes to several hours. As PVA concentration is high in the sealing film 5, the film 5 can be dried naturally or at a relatively low temperature. In this drying process, water in the sealing film 5 volatizes and evaporates, so that the sealing film 5 gets thinner in comparison with the thickness right after the application of solution as shown in FIG. 6A.

Figure 6B:
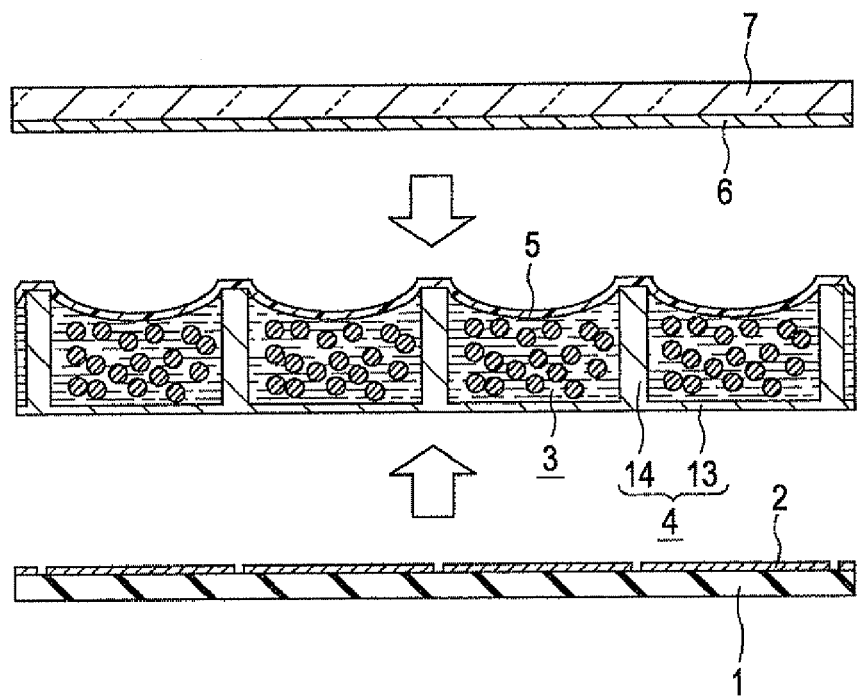

Then, as shown in FIG. 6B, the circuit substrate 1 having the pixel electrodes 2 and the counter substrate 7 having the counter electrode 6 are prepared. Like the circuit substrate 1, the counter substrate 7 is, for instance, a resin substrate such as a PC and a PET, a glass substrate, or the like. In case of adding flexibility to the electrophoretic display device 100, a flexible resin substrate is selected for the counter substrate 7.

Then, the circuit substrate 1 and the counter substrate 7 are fixed to the cell matrix 4. As shown in FIG. 613, the side of the circuit substrate 1 having the pixel electrodes 2 is fixed to the base 13 side of the cell matrix 4. In addition, the side of the counter substrate 7 having the counter electrode 6 is fixed to the side of the cell matrix 4 formed with the sealing film 5. For fixing, an adhesive (not shown) may be used. As a result, the electrophoretic display device 100 shown in FIG. 1 and FIG. 2 is provided.

According to the embodiment of the invention, the electric field intensity is small at the periphery of a cell, thereby reducing the effect of the electric field at the periphery of the cell on the electrophoretic particles 11 of other cells adjacent to the cell. Accordingly, crosstalk between the adjacent cells can be reduced, and thus an image is expected to have better contrast. Moreover, the distance d1 between the electrodes at the center of a cell is made short, thus allowing the reduction of a drive voltage at each cell. As a result, the electrophoretic display device 100 is expected to use less power.

Embodiment 2

In Embodiment 1, the sealing film 5 and the counter electrode 6 are formed so as to have an even thickness, and the depression of the electrophoretic layer 3 surface appears on top of the counter electrode 6 through the sealing film 5 as shown in FIG. 1 and FIG. 2. However, the invention is not limited to this. In the invention, the top surface of the counter electrode 6 may be flattened by burying the counter electrode 6 in the depression. This will be explained in Embodiment 2.

Figure 8:
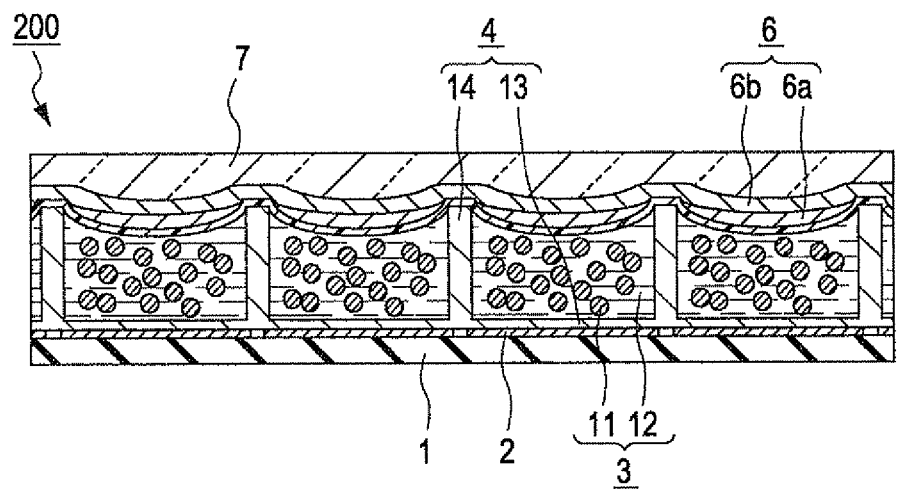
FIG. 8 is a diagram of an electrophoretic display device in accordance with another embodiment of the present invention.
Figure 9:
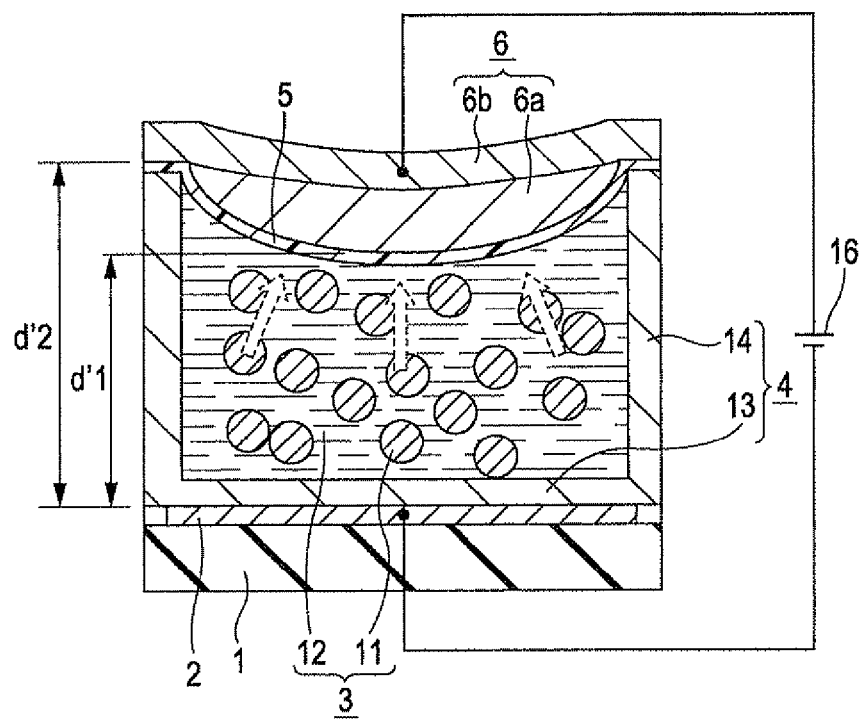
FIG. 9 is an enlarged sectional view of FIG. 8.

FIG. 8 is a cross-sectional view showing an electrophoretic display device 200 in accordance with the second embodiment of the invention. FIG. 9 is an enlarged sectional view of FIG. 8, showing a cross section of one cell.

In the electrophoretic display device 200, the counter electrode 6 has a first conductive film 6a and a second conductive film 6b as shown in FIG. 8 and FIG. 9. The sealing film 5 is formed along the surface of the electrophoretic layer 3 at a constant thickness, so that the depression of the layer 3 appears on the surface of the sealing film 5. The first conductive film 6a is buried in the depression on the surface of the sealing film 5. The second conductive film 6b is formed so as to cover the first conductive film 6a, so that the surface of the counter electrode 6 is flattened.

The first conductive film 6a and the second conductive film 6b are made of, for instance, an opaque conductive film such as Al film or a transparent film such as ITO film. The first conductive film 6a and the second conductive film 6b may be made of the same material or different materials.

When the first conductive film 6a and the second conductive film 6b are made of transparent conductive films, respectively, letters, images and the like on a screen can be visually recognized from the counter substrate 7. Moreover, when at least one of the first conductive film 6a and the second conductive film 6b is made of an opaque conductive film, letters, images and the like on a screen can be visually recognized from the circuit substrate 1 as the pixel electrodes 2 are made of a transparent conductive film.

Subsequently, the method of forming the counter electrode 6 having the first conductive film 6a and the second conductive film 6b will be explained.

Figure 10A:
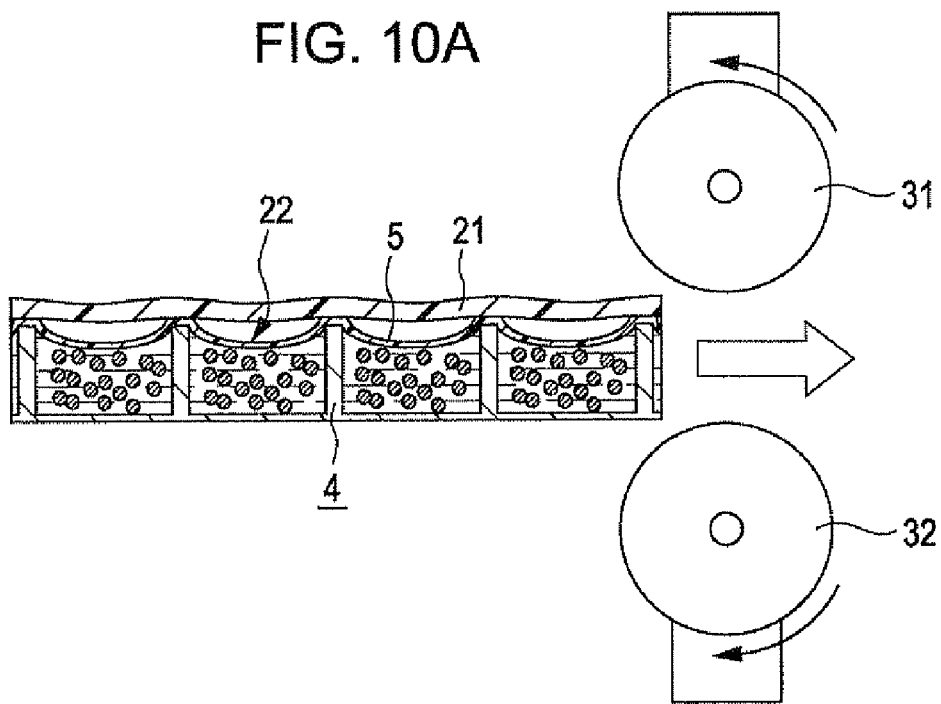
FIGS. 10A and 10B show a method of forming a counter electrode relating to the embodiment.
Figure 10B:
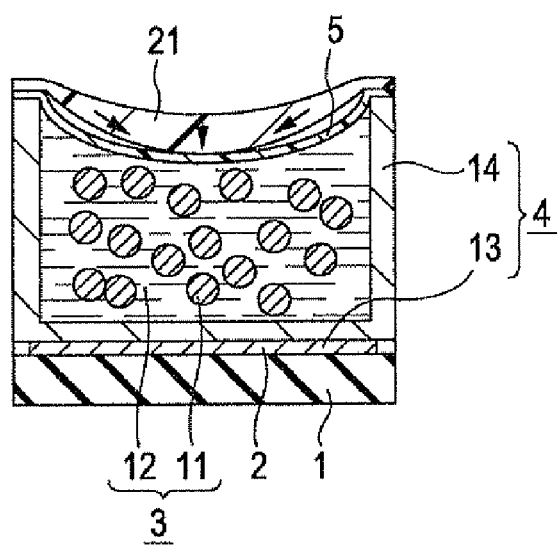

FIGS. 10A and 10B are conceptual views, showing the method of forming the counter electrode 6 relating to Embodiment 2 of the present invention.

As shown in FIG. 10A, a sheet-form conductive resin 21 is first arranged on the cell matrix 4 after the sealing film 5 is formed. The conductive resin 21 is, for instance, thermoplastic (which softens as heated). Then, the conductive resin 21 is heated to flow into the depressed sections 22 at the surface of the sealing film 5. For instance, the cell matrix 4 having the sheet-form conductive resin 21 thereon is passed through a pair of rollers 31, 32 having a heating function such as a heater. Thus, the conductive resin 21 is heated and pressed against the cell matrix 4, thereby flowing into the depressed sections as illustrated with arrows shown in FIG. 10B. After passing through the rollers 31, 32, the conductive resin 21 is cooled and thus loses its fluidity and hardens. The conductive resin 21 hardened inside the depressed sections is, for example, the first conductive film 6a shown in FIG. 8 and FIG. 9.

Then, the second conductive film 6b is formed on the first conductive film 6a. The second conductive film 6b is formed, for instance, on one surface of the counter substrate 7 shown in FIG. 6. The side of the counter substrate 7 having the second conductive film 6b is fixed to the side of the cell matrix 4 formed with the first conductive film 6a. For fixing, for instance, a conductive adhesive (not shown) may be used.

Alternatively, when the second conductive film 6b is made of the thermoplastic conductive resin 21, the first conductive film 6a and the second conductive film 6b may be made in one body by heating and pressing the films 6a and 6b. Thus, the counter electrode 6 shown in FIG. 8 and FIG. 9 is provided.

According to Embodiment 2 of the invention, a distance d'1 between the electrodes at the center of a cell and a distance d'2 between the electrodes at the periphery of the cell have a relation of d'1<d'2 (see FIG. 9), thereby reducing crosstalk, drive voltages and the like.

A depressed section 22 on the surface of the sealing film 5 is flattened by burying the first conductive film 6a therein. Furthermore, the second conductive film 6b can be formed thereon. Since the surface of the counter electrode 6 can be flattened, adhesion between the counter electrode 6 and the counter substrate 7 is maintained and adhesion strength improves. In addition, diffused reflection of light at the surface of the counter electrode 6 can be controlled. As regards to visually recognizing letters, images and the like on a screen from the counter substrate 7, visibility is expected to improve as the diffused reflection of light is restrained.

Others

Although the first conductive film 6a and the second conductive film 6b are formed separately in Embodiment 2 as described above, the invention is not limited to this. In the invention, the first conductive film 6a and the second conductive film 6b may be formed at the same time, as one film. For example, by selecting a sufficiently thick sheet for the conductive resin 21, the conductive resin 21 can be used as the counter electrode 6 after filled the depressed section 22 by heating and then cooling. In this case, the electrophoretic display device 200 is provided by fixing a counter substrate 7 onto the hardened conductive resin 21 (in other words, counter electrode 6).

The first conductive film 6a is made of thermoplastic conductive resin 21 in Embodiment 2, but the invention is not limited to this. The first conductive film Ga may be made of metal such as silver (Ag). The film may be formed, for example, by filling a depressed section with Ag paste using a squeegee. Even in this film structure, crosstalk, drive voltages and the like can be reduced. The surface of the counter electrode 6 can also be flattened.

The entire disclosure of Japanese Patent Application No. 2010-136134, filed Jun. 15, 2010 is expressly incorporated by reference herein.

What is claimed is:

1. An electrophoretic display device comprising:
   a first substrate;
   a second substrate opposite to the first substrate;
   an electrophoretic layer arranged between the first substrate and the second substrate, the electrophoretic layer including:
      electrophoretic particles; and
      a dispersion medium that disperses the electrophoretic particles;
   first electrodes arranged between the first substrate and the electrophoretic layer;
   a partition wall that divides the electrophoretic layer into a plurality of cells; and
   a second electrode arranged between the second substrate and the electrophoretic layer, and arranged between the second substrate and the partition wall, wherein the second electrode protrudes towards the first electrode at the cell, wherein
      a surface that opposes the second electrode of the electrophoretic layer is depressed in response to the protrusion of the second electrode at the cell; and wherein the second electrode has a first conductive film that fills the depressed section and a second conductive film that covers the first conductive film.

2. The electrophoretic display device according to claim 1, wherein a distance between the first electrode and the second electrode at the center of the cell in plan view is shorter than a distance between the first electrode and the second electrode at the periphery of the cell in plan view.

3. The electrophoretic display device according to claim 1, wherein the dispersion medium is a lipophilic solvent, and the surface of the partition wall is made of a lipophilic material.

4. The electrophoretic display device according to claim 1, wherein a contact angle θ between the dispersion medium and the partition wall is within the range of $0°<θ<20°$.

5. The electrophoretic display device according to claim 1, further comprising:
   a sealing film between the electrophoretic layer and the second electrode at the cell.

6. The electrophoretic display device according to claim 5, wherein the sealing film is formed along the surface of the electrophoretic layer so as to have a constant thickness.

7. An electrophoretic display device comprising:
   a first substrate;
   a second substrate opposite to the first substrate;
   an electrophoretic layer arranged between the first substrate and the second substrate, the electrophoretic layer including:
      electrophoretic particles; and
      a dispersion medium that disperses the electrophoretic particles;
   first electrodes arranged between the first substrate and the electrophoretic layer;
   a partition wall that divides the electrophoretic layer into a plurality of cells; and
   a second electrode arranged between the second substrate and the electrophoretic layer, the second electrode including:
      a first conductive film arranged between the second substrate and the electrophoretic layer, the first conductive film protruding towards the first electrode of the cell; and
      a second conductive film arranged between the second substrate and the first conductive film.

8. An electrophoretic display device comprising:
   a first substrate;
   a second substrate opposite to the first substrate;
   an electrophoretic layer arranged between the first substrate and the second substrate, the electrophoretic layer including:
      electrophoretic particles; and
      a dispersion medium that disperses the electrophoretic particles;
   first electrodes arranged between the first substrate and the electrophoretic layer;
   a partition wall that divides the electrophoretic layer into a plurality of cells; and
   a second electrode arranged between the second substrate and the electrophoretic layer, and arranged between the second substrate and the partition wall, wherein the second electrode protrudes towards the first electrode at the cell; and
   a sealing film between the electrophoretic layer and the second electrode at the cell, wherein
      the sealing film is formed along the surface of the electrophoretic layer so as to have a constant thickness.

* * * * *